(12) United States Patent
Chakraborty et al.

(10) Patent No.: US 11,632,446 B2
(45) Date of Patent: Apr. 18, 2023

(54) UNIVERSAL GATEWAY SOLUTION WITH BI-DIRECTIONAL DATA TRANSFER, MANAGEMENT, AND CONTROL FROM MULTIPROTOCOL SENSORS AND END-DEVICES FOR VARIOUS IOT NETWORKS

(71) Applicant: Zurn Industries, LLC, Milwaukee, WI (US)

(72) Inventors: Arindam Chakraborty, Milwaukee, WI (US); Brandon Feil, Milwaukee, WI (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 17/211,440

(22) Filed: Mar. 24, 2021

(65) Prior Publication Data
US 2022/0311840 A1    Sep. 29, 2022

(51) Int. Cl.
*H04L 69/18* (2022.01)
*G16Y 40/35* (2020.01)

(52) U.S. Cl.
CPC .............. *H04L 69/18* (2013.01); *G16Y 40/35* (2020.01)

(58) Field of Classification Search
CPC ................................ H04L 69/18; G16Y 40/35
See application file for complete search history.

(56) References Cited

U.S. PATENT DOCUMENTS

| 2018/0004704 A1* | 1/2018 | Czako | G06F 13/1673 |
| 2021/0150159 A1* | 5/2021 | Volkerink | G06K 19/07758 |

FOREIGN PATENT DOCUMENTS

CN    104456966 B  *  8/2018

* cited by examiner

*Primary Examiner* — Zhensheng Zhang
(74) *Attorney, Agent, or Firm* — Michael Best & Friedrich LLP

(57) ABSTRACT

Methods and systems of monitoring and managing a facility. One system includes a universal gateway device including an electronic processor configured to receive, via a first communication protocol, a first set of data from a first end point device. The electronic processor is also configured to receive, via a second communication protocol different from the first communication protocol, a second set of data from a second end point device. The electronic processor is also configured to process the first set of data and the second set of data pursuant to a third communication protocol. The electronic processor is also configured to enable, via the third communication protocol, transmission of the processed first set of data and the processed second set of data to a remote device for virtual processing.

20 Claims, 5 Drawing Sheets

UNIVERSAL GATEWAY SOLUTION WITH BI-DIRECTIONAL DATA TRANSFER, MANAGEMENT, AND CONTROL FROM MULTIPROTOCOL SENSORS AND END-DEVICES FOR VARIOUS IOT NETWORKS

FIELD

Embodiments relate to a universal gateway solution, and, more particularly, to a universal gateway solution that simplifies bi-directional data collection, management, and control from multiprotocol sensors and endpoint devices to a single internet of things ("IoT") network.

SUMMARY

In the field of facility or building management, there is a desire to monitor performance of restroom fixtures, such as, for example, faucets, flush valves, hand dryers, floor drains, air or room quality sensors, backflow preventers, bottle fillers, pressure sensors, leak detection sensors, occupancy detection sensors, resource dispensers (for example, a soap dispenser, a sanitizer dispenser, a room deodorizer dispenser, a paper tower dispenser), and the like. As one example, a building manager may want to monitor water usage or consumption for one or more restroom facilities within the building. Such monitoring may be performed for predictive maintenance, alerting, for collecting data on usage of the restroom(s), or the like. For example, monitoring may indicate that there is a certain percentage of life remaining for a flush valve (or a component of the flush valve) based on a rated life of flushes and a number of flush operations performed by the flush valve. As another example, monitoring may generate alerts, such as a low soap alert, a backflow discharge in progress alert, a drain clogged alert, and the like.

However, in some situations, multiple end point devices or sensors may be used to monitor various fixtures, where each end point device or sensor may be associated with various wireless technologies or protocols. In other words, various wireless technologies or protocols may co-exist or co-operate in order to monitor a collection of fixtures. In such situations, multiple gateways or routers are used specific to each unique technology or protocol to collect and forward the data to, for example, an appropriate IoT backend network server. As one example, where a first sensor communicates with a first end-point device with BLE technology and a second sensor communicates with a second end-point device with LoRa technology, two gateways (a gateway specific to BLE technology and a gateway specific to LoRa technology) will be required to communicate between the sensors and the corresponding cloud networks for each party.

Accordingly, the embodiments described herein provide methods and systems for monitoring and managing a facility (for example, a building or one or more rooms within a building) using a universal gateway that is compatible with multiple technologies or protocols. Embodiments described herein enable a simplified and more cost-effective solution to providing bi-directional data collection, management, and control from multiprotocol sensors and endpoint devices to a single network, such as an IoT network.

For example, one embodiment provides a universal gateway device associated with a facility. The universal gateway device includes an electronic processor configured to receive, via a first communication protocol, a first set of data from a first end point device, the first set of data related to an operation of a first fixture associated with the first end point device. The electronic processor is also configured to receive, via a second communication protocol different from the first communication protocol, a second set of data from a second end point device, the second set of data related to an operation of a second fixture associated with the second end point device. The electronic processor is also configured to process the first set of data and the second set of data for transmission via a third communication protocol. The electronic processor is also configured to enable, via the third communication protocol, transmission of the processed first set of data and the processed second set of data to a remote device for virtual processing.

Another embodiment provides a system for monitoring and managing a facility. The system includes a universal gateway device including an electronic processor. The electronic processor is configured to receive, via a first communication protocol, a first set of data from a first end point device, the first set of data related to an operation of a first fixture associated with the first end point device. The electronic processor is also configured to receive, via a second communication protocol different from the first communication protocol, a second set of data from a second end point device, the second set of data related to an operation of a second fixture associated with the second end point device. The electronic processor is also configured to process the first set of data and the second set of data pursuant to a third communication protocol. The electronic processor is also configured to enable, via the third communication protocol, transmission of the processed first set of data and the processed second set of data to a remote device for virtual processing.

Yet another embodiment provides a method for monitoring and managing a facility. The method includes receiving, via a first communication protocol, a first set of data from a first end point device, the first set of data related to an operation of a first fixture associated with the first end point device. The method also includes receiving, via a second communication protocol different from the first communication protocol, a second set of data from a second end point device, the second set of data related to an operation of a second fixture associated with the second end point device. The method also includes processing, with an electronic processor, the first set of data and the second set of data pursuant to a third communication protocol. The method also includes enabling, via the third communication protocol, transmission of the processed first set of data and the processed second set of data to a remote device for virtual processing.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
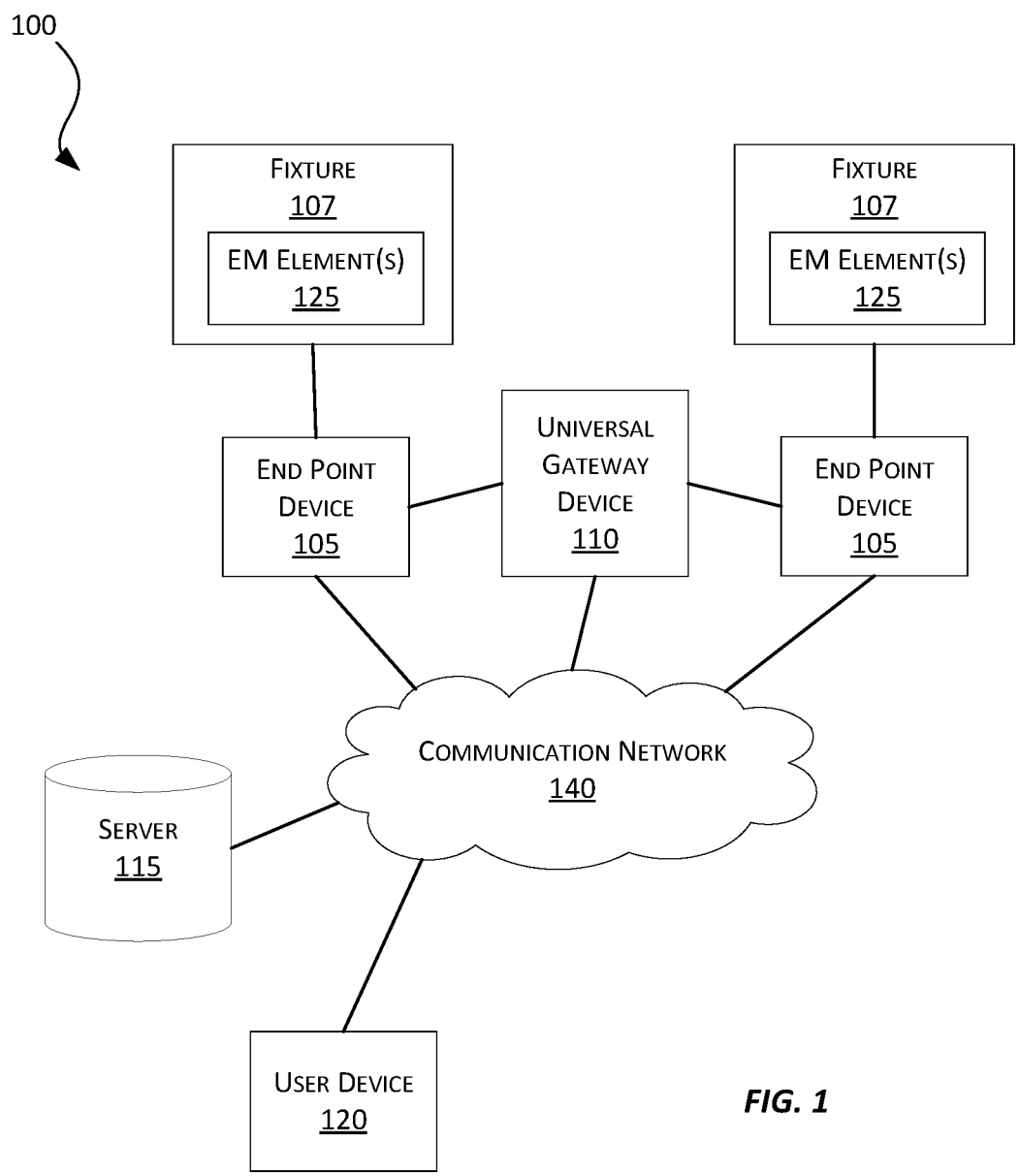
FIG. 1 schematically illustrates a system for monitoring and managing a facility using a universal gateway device according to some embodiments.

FIG. 1 illustrates a system 100 for monitoring and managing a facility (for example, a building or one or more rooms within a building) according to some embodiments. In the illustrated example, the system 100 includes a plurality of end point devices 105 (collectively referred to herein as "the end point devices 105" and individually as "an end point device 105"), a plurality of fixtures 107 (collectively referred to herein as "the fixtures 107" and individually as "a fixture 107"), a universal gateway device 110, a server 115 (for example, cloud server), and a user device 120. In some embodiments, the system 100 includes fewer, additional, or different components than illustrated in FIG. 1 in various configurations. For example, the system 100 may include multiple universal gateway devices 110, servers, 115, user devices 120, or a combination thereof. Additionally, the system 100 may include any number of end point devices 105 and/or fixtures 107 and the two endpoint devices and fixtures illustrated in FIG. 1 are purely for illustrative purposes. Also, in some embodiments, one or more of the components of the system 100 may be distributed among multiple devices, combined within a single device, or a combination thereof. As one example, in some embodiments, one or more of the end point devices 105 may be incorporated within a fixture 107 as a single device. Accordingly, in some embodiments, the functionality described as being performed by the end point device 105 (or a portion thereof) may be performed by a fixture 107 (including built-in or attached similar hardware and software components as the end point device 105).

The end point devices 105, the fixtures 107, the universal gateway device 110, the server 115, and the user device 120 communicate over one or more wired or wireless communication networks 140. Portions of the communication networks 140 may be implemented using a wide area network ("WAN"), such as the Internet or a LoRa system, a local area network ("LAN"), such as a Bluetooth™ network or Wi-Fi, and combinations or derivatives thereof. Accordingly, components of the system 100 may be configured to communicate via Bluetooth, Wi-Fi, Zigbee, LTE/Cellular, wired ethernet, RS485/RS232, or the like. As one example, the end point devices 105 may communicate via LoRa with the universal gateway device 110. Alternatively or in addition, in some embodiments, one or more components of the system 100 communicate directly as compared to through the communication network 140. For example, in some embodiments, the end point devices 105 communicate directly with the universal gateway device 110. In some embodiments, a first end point devices 105 communicates via a first communication protocol while a second end point device 105 communicates via a second communication protocol different from the first communication protocol. As one example, a first end point devices 105 may communicate via LoRa while a second end point device 105 communicates via a Bluetooth Low Energy ("BLE") network. Also, in some embodiments, the components of the system 100 communicate through one or more intermediary devices not illustrated in FIG. 1.

Additionally, in some embodiments, one or more components of the system 100 communicate using LoRa or LoRaWAN networking protocols (for example, the end point device 105 and the universal gateway device 110). Using such networking protocols provides for secure, encrypted communication of data without use of a customer or building network. Accordingly, use of such networking protocols may completely isolate an end point device 105 (or other component of the system 100) from a customer or building network.

A fixture 107 may include, for example, a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air or room quality sensor (for example, may include a service request or product replenishment request button or other suitable activator), a backflow preventer, a leak detection sensor, an occupancy detection sensor, and a resource dispenser (for example, a soap dispenser, a sanitizer dispenser, a room deodorizer dispenser, a paper tower dispenser), and the like. Accordingly, in some embodiments, the fixture 107 provides a water management solution. As seen in FIG. 1, each of the fixtures 107 is associated with one or more electro-mechanical ("EM") elements 125. The EM elements 125 are configured to monitor and/or influence the operation of the fixture 107. An EM element 125 may include, but is not limited to, an actuator, a flow sensor, a position sensor, a proximity sensor, a thermocouple, and the like. It is contemplated that the EM elements 125 may include an electrical only element, a mechanical only element, or a combination of an electrical and a mechanical element(s). The EM elements 125 may include a single-piece component or multiple components.

As one example, in some embodiments, the fixture 107 is a faucet having a sensor (for example, as a first EM element 125) configured to detect the presence of a person within a specified zone. When the sensor is triggered (for example, by detecting the presence of a person), the sensor sends an "ON" signal to an actuator (as a second EM element 125) (for example, a valve actuating solenoid) thereby allowing water to selectively flow through the faucet. When the sensor is no longer triggered (for example, by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In such embodiments, the predetermined period of time may be set by a user or facility entity via, for example, the universal gateway device 110, the user device 120, another component of the system 100, or a combination thereof.

As another example, in some embodiments, the fixture 107 is a flush valve having a sensor (for example, as a first EM element 125) configured to detect the presence of a person within a specified zone. When the sensor is triggered (for example, by detecting the presence of a person), the sensor sends an "ON" signal to the actuator (as a second EM element 125) (for example, a valve actuating solenoid) to actuate a valve and initiate a flow of water for a flushing event. The flush valve will then remain open for a predetermined period of time (for example, 5 seconds, 10 seconds, and the like) at least partially dependent upon an operating parameter set by the user via, for example, the universal gateway device 110, the user device 120, another component of the system 100, or a combination thereof.

As yet another example, in some embodiments, the fixture 107 is a resource dispenser (such as a soap dispenser, a hand towel dispenser, and the like) having a sensor (for example, as a first EM element 125) configured to detect the presence of a person within a specified zone. When the sensor is triggered (for example, by the hands of a person), the sensor sends an "ON" signal to an actuator (for example, as a second EM element 125) to trigger a resource dispensing event (for example, actuation of a gear, a valve, or solenoid, and the like to initiate dispensing of a resource). The resource dispenser is configured to allow a predetermined volume or amount of a resource to be dispensed for each activation. In such embodiments, the volume or amount or timing of a resource to be dispensed may be set and adjusted by the user via, for example, the universal gateway device 110, the user device 120, another component of the system 100, or a combination thereof.

The resource dispenser may also include a second sensor (for example, as a third EM element 125) to monitor the level or amount of resource remaining in a reservoir or receptacle. In some embodiments, the second sensor detects a current level or amount of resource in the reservoir or receptacle at a given moment in time. Alternatively or in addition, the second sensor may detect when the resource falls below a predetermined amount or level.

As yet another example, in some embodiments, the fixture 107 is a water service line monitor. The water service line monitor includes a sensor (for example, as a first EM element 125) configured to be retrofit onto an existing water service line and is configured to monitor the flow-rate of water therethrough, the presence of a backflow event, or a combination thereof. More specifically, the sensor may be configured to detect a flow rate, a presence of a backflow event, and the like.

As seen in FIG. 1, an end point device 105 generally includes a communication link with at least one fixture 107. The end point devices 105 may span multiple facilities, locations, rooms, and the like. In some embodiments, each of the end point devices 105 is associated with (located within) the same facility (for example, a restroom facility). However, in other embodiments, the end point devices 105 are associated with multiple facilities. As one example, a first end point device may be associated with a first facility, and a second end point device may be associated with a second different facility that is either in the same building as the first facility or in an entirely different building. Alternatively or in addition, in some embodiments, each of the end point devices 105 is associated with the same type of restroom fixture (for example, the fixture 107). However, in other embodiments, the end point devices 105 are associated with multiple different types of restroom fixtures (for example, the fixture 107). As one example, a first end point device may be associated with a faucet (as a first fixture 107) and a second end point device may be associated with a soap dispenser (as a second fixture 107).

Figure 2:
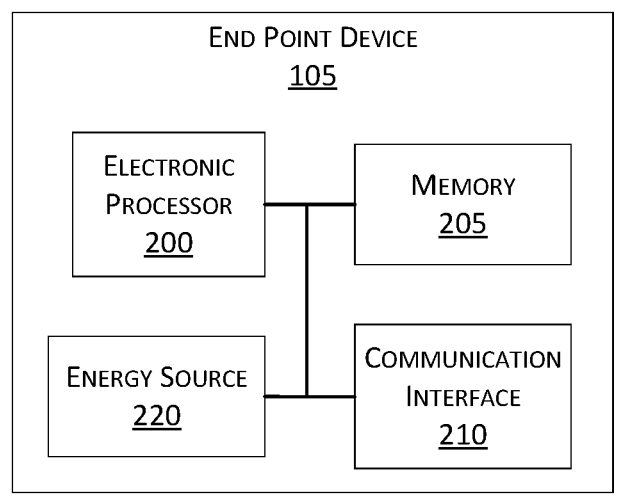
FIG. 2 schematically illustrates an end point device included in the system of FIG. 1 according to some embodiments.

FIG. 2 illustrates an end point device 105 according to some embodiments. In the illustrated example, the end point device 105 includes an electronic processor 200, a memory 205, a communication interface 210, and an energy source 220. The electronic processor 200, the memory 205, the communication interface 210, and the energy source 220 communicate wirelessly, over one or more communication lines or buses, or a combination thereof. In some embodiments, one or more components of the end point device 105 may be distributed among multiple devices, integrated into a single device, or a combination thereof. In some embodiments, the end point device 105 may perform additional functionality other than the functionality described herein. In some embodiments, the end point device 105 may include additional, different, or fewer components than those illustrated in FIG. 2 in various configurations. As one example, in some embodiments, the end point device 105 includes multiple energy sources 220. As another example, in some embodiments, the end point device 105 includes one or more expansion ports allowing for future expansion of the end point device 105. As one example, additional electro-mechanical ("EM") elements of a fixture 107 may be connected to the end point device 105 via the one or more of the expansion ports.

The communication interface 210 allows the end point device 105 to communicate with devices external to the end point device 105. For example, as illustrated in FIG. 1, the end point device 105 may communicate with the fixture 107 (or an EM element 125 thereof), the universal gateway device 110, the server 115, the user device 120, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the communication interface 210 includes a port for receiving a wired connection between the universal gateway device 110 and an EM element 125 of a corresponding fixture 107. As another example, in some embodiments, the communication interface 210 includes a radio or transceiver for establishing a wireless connection, over a LoRa system or network, between the end point device 105 and the universal gateway device 110.

The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, in some embodiments, the electronic processor 200 is configured to enable management and/or monitoring of the operation of the corresponding fixture 107 either directly or indirectly (for example, via the EM element(s) 125 of the corresponding fixture 107). In some embodiments, the electronic processor 200 enables management and/or monitoring of the operation of a corresponding fixture 107 by receiving fixture data from the fixtures 107, converting the fixture data for transmission, and enabling transmission of the converted data to, for example, the universal gateway device 110, the server 115, the user device 120, another component of the system 100, or a combination thereof.

Accordingly, in some embodiments, the electronic processor 200 is configured to interact with and collect data regarding an operation of a fixture 107 (as fixture data) via the EM elements 215 either directly or indirectly. In some embodiments, the end point device 105 is configured to remain in a sleep mode (or deep sleep mode) until an action or operation is detected with respect to a fixture 107 associated with the end point device 105 (for example, detecting the presence of a user). In response to detecting the action or operation, the end point device 105 may then wake-up to receive fixture data, convert the fixture data for transmission, and transmit the fixture data (in a minimum power consumption mode) to, for example, the universal gateway device 110, the server 115, the user device 120, another component of the system 100, or a combination thereof. This results in optimized battery life for the product. As one example, in some embodiments, when the end point device 105 transmits the converted fixture data (for example, as one or more data packets) to the universal gateway device 110, the transmission may occur through adaptable data rate, which automatically selects the most easily available channel such that the right channel does not have to be searched for, which further aids in the optimization of power.

As seen in FIG. 2, in some embodiments, the end point device 105 also includes the energy source 220. The energy source 220 powers one or more components of the end point device 105, such as the electronic processor 200. The energy source 220 may be a battery, such as an energy efficient battery, a re-chargeable battery, a lithium-ion battery, a replaceable battery, or the like. As one example, the energy source 220 is a standard battery (for example, AAA, AA, C, D sized batteries). As noted above, in some embodiments, the end point device 105 includes multiple energy sources 220 (for example, a first energy source, a second energy source, and the like). In such embodiments, the multiple energy sources 220 may be of the same type, different types, or a combination thereof. As one example, the end point device 105 may include three AA batteries as the energy sources 220. Alternatively or in addition, in some embodiments, the end point device 105 includes a port for receiving a wired connection to an external energy source, such as a facility's main power source.

In some embodiments, one or more components of the system 100 may already be present in a completed fixture 107 (for example, a proximity sensor and an actuator in an automated faucet). In such embodiments, additional components may be retro-fit onto the existing fixture 107. Accordingly, in some embodiments, the end point device 105 (or components thereof) may be retro-fit onto or into the existing fixture 107. As one example, a transmitter, a receiver, a transceiver, or a combination thereof (as part of the communication interface 210), the electronic processor 200, the energy source 220, or a combination thereof may be mounted in the plumbing immediately upstream of a particular fixture 107. In other examples, the retro-fit may include updating firmware in the already existing device. In still other examples, the retro-fit may include integrating elements into a previously existing fixture 107.

Figure 3:
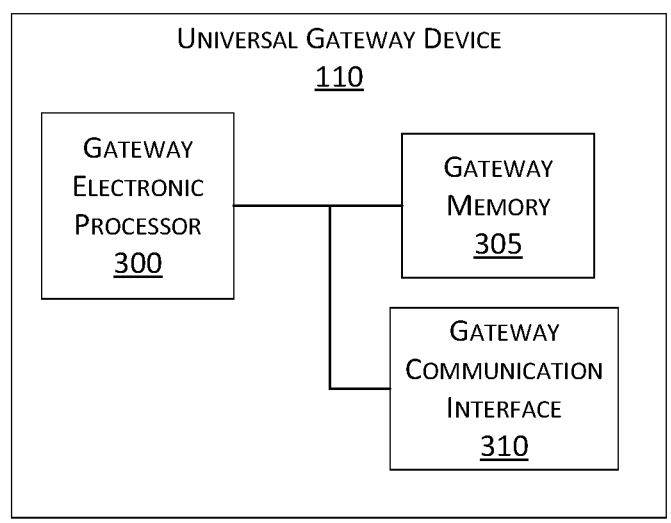
FIG. 3 schematically illustrates the universal gateway device included in the system of FIG. 1 according to some embodiments.

FIG. 3 illustrates the universal gateway device 110 according to some embodiments. In the illustrated example, the universal gateway device 110 includes a gateway electronic processor 300, a gateway memory 305, and a gateway communication interface 310. The gateway electronic processor 300, the gateway memory 305, and the gateway communication interface 310 communicate wirelessly, over one or more communication lines or buses, or a combination thereof. The universal gateway device 110 may include additional, different, or fewer components than those illustrated in FIG. 3 in various configurations. For example, in some embodiments, the universal gateway device 110 includes a human-machine interface for interacting with a user. The human machine interface may include one or more input devices, one or more output devices, or a combination thereof. In some embodiments, one or more components of the universal gateway device 110 may be distributed among multiple devices, integrated into a single device, or a combination thereof. In some embodiments, the universal gateway device 110 may perform additional functionality other than the functionality described herein. Also, the functionality (or a portion thereof) described herein as being performed by the universal gateway device 110 may be distributed among multiple devices.

The gateway communication interface 310 allows the universal gateway device 110 to communicate with devices external to the universal gateway device 110. For example, as illustrated in FIG. 1, the universal gateway device 110 may communicate with the end point devices 105, the fixtures 107, the server 115, the user device 120, or a combination thereof through the gateway communication interface 310. The gateway communication interface 310 may include a port for receiving a wired connection to an external device (for example, a USB cable and the like), a transceiver for establishing a wireless connection to an external device (for example, over one or more communication networks 140, such as the Internet, a LAN, a WAN, such as a LoRa system, and the like), or a combination thereof.

The gateway electronic processor 300 is configured to access and execute computer-readable instructions ("software") stored in the gateway memory 305. The software may include firmware, one or more applications, program data, filters, rules, one or more program modules, and other executable instructions. For example, the software may include instructions and associated data for performing a set of functions, including the methods described herein.

The universal gateway device 110 serves as a universal gateway or intermediary device that receives data and forwards/transmits the data. In some embodiments, the universal gateway device 110 receives and transmits data in a bi-directional manner. For example, in some embodiments, the universal gateway device 110 receives fixture data from one or more of the endpoint devices 105 and transmits the fixture data to another component of the system for processing, such as the server 115, the user device 120, or a combination thereof. For example, in some embodiments, the universal gateway device 110 forwards the fixture data to a remote server (for example, the server 115) for virtual processing. Alternatively or in addition, the universal gateway device 110 receives control data (such as an operation command) from the server 115, the user device 120, or a combination thereof and transmits the control data to one or more of the endpoint devices 105. As one example, the universal gateway device 110 may receive an operation command for operating a fixture 107 (as control data) from the user device 115 and forward or transmit the operation command to the fixture 107 (via a corresponding end point device 105). In response to receiving the operation command, the fixture 107 may operate in accordance with the operation command.

The universal gateway device 110 supports (or is compatible with) multiple protocols or technologies, including, for example, LoRaWAN, BLE, NB-IoT, LTE, another industry standard protocol, or a combination thereof. Accordingly, in some embodiments the universal gateway device 110 receives multiple sets of fixture data, where at least one set of fixture data is communicated via a communication protocol different from another communication protocol used to communicate another different set of fixture data. As one example, the universal gateway device 110 receives a first set of fixture data from a first end point device 105 via a first communication protocol, such as LoRa, and receives a second set of fixture data from a second end point device 105 via a second different communication protocol, such as BLE.

Alternatively or in addition, the universal gateway device 110 may receive control data from, for example, the server 115, the user device 120, or a combination thereof and transmits the control data to one or more of the end point devices 105. The universal gateway device 110 may transmit the control data to one or more of the end point devices 105 using a communication protocol different from the communication protocol used to transmit the control data to the universal gateway device 110. As one example, the universal gateway device 110 may receive control data via a first communication protocol, such as LoRa, and may transmit the control data to an end point device 105 via a second communication protocol different from the first communication protocol. Alternatively or in addition, the universal gateway device 110 may transmit the control data to one or more of the end point devices 105 using a communication protocol that is the same as the communication protocol used to transmit the control data to the universal gateway device 110. As one example, the universal gateway device 110 may receive control data via a first communication protocol, such as LoRa, and may transmit the control data to an end point device 105 via the first communication protocol.

Accordingly, in some embodiments, the universal gateway device 110 (i.e., the gateway electronic processor 300) performs local processing of the received data. In some embodiments, the universal gateway device 110 receives encrypted messages (for example, encrypted fixture data) from one or more of the end point devices 105. Each encrypted message may include a unique identifier (for example, a "UID"). In response to receiving the encrypted messages, the universal gateway device 110 (via the gateway electronic processor 300) decrypts the encrypted messages using one or more security keys. After performing the decryption, the universal gateway device 110 (via the gateway electronic processor 300) analyzes the decrypted data and performs various message processing steps to derive meaningful information from the decrypted data, such that actionable insights and valuable analytics, trends, patterns, and the like may be generated therefrom. Accordingly, in some embodiments, the universal gateway device 110 functions as a local cloud server for the one or more end point devices 105. Alternatively or in addition, in some embodiments, the universal gateway device 110 then transmits the derived information to a cloud network or remote device or server for further processing (such as to, for example, the server 115, the user device 120, or a combination thereof).

Returning to FIG. 1, the server 115 and the user device 120 are computing devices, such as a desktop computer, a laptop computer, a tablet computer, a terminal, a smart telephone, a smart television, a smart wearable, or another suitable computing device that interfaces with a user. Although not illustrated in FIG. 1, the server 115 and the user device 120 may include similar components as the universal gateway device 110, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

In some embodiments, the server 115 may include multiple electronic processors, multiple memory modules, multiple communication interfaces, or a combination thereof. Also, it should be understood that the functionality described herein as being performed by the server 115 may be performed in a distributed nature by a plurality of computers located in various geographic locations. For example, the functionality described herein as being performed by the server 115 may be performed by a plurality of computers included in a cloud computing environment.

The server 115 is configured to monitor and manage one or more facilities (for example, individual restrooms or entire buildings), including the fixtures 107 therein. In some embodiments, the server 115 (via an electronic processor of the server 115) may receive fixture data from the universal gateway device 110. In response to receiving the data, the server 115 may process the data in order to determine usage information or patterns associated with the one or more facilities, including the fixtures 107 thereof. The server 115 may store the usage information or patterns in, for example, a memory of the server 115. Alternatively or in addition, the server 115 may transmit the usage information or patterns to a remote device for storage.

A user may interact with and access data associated with one or more facilities, such as one or more of the fixtures 107 therein (for example, the usage information or patterns determined by the server 115). The user device 120 may be used by an end user, such as a facility entity, to monitor and manage a facility (a single restroom or multiple restrooms in a building), one or more fixtures 107 of a facility, or a combination thereof. For example, a user may access and interact with the data determined by the server 115 to view and understand usage patterns, which may allow a facility entity or maintainer insights into, for example, how to optimize cleaning and maintenance schedules, whether there is a need for additional facilities, end point devices, or a combination thereof. For example, to communicate with the server 115 (i.e., the usage information or patterns determined by the server 115), the user device 120 may store a browser application or a dedicated software application executable by an electronic processor for interacting with the server 115.

Figure 4:
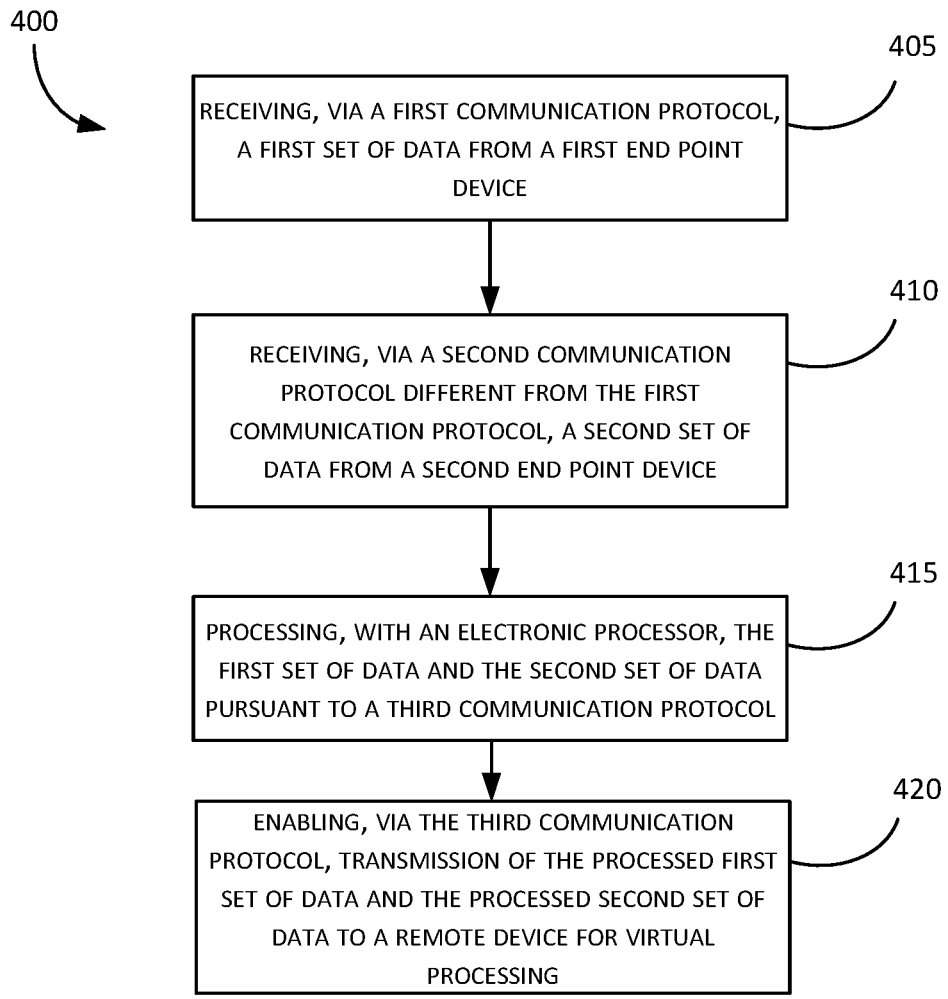
FIG. 4 is a flowchart illustrating a method for monitoring and managing a facility using a universal gateway device using the system of FIG. 1 according to some embodiments.
Figure 5:
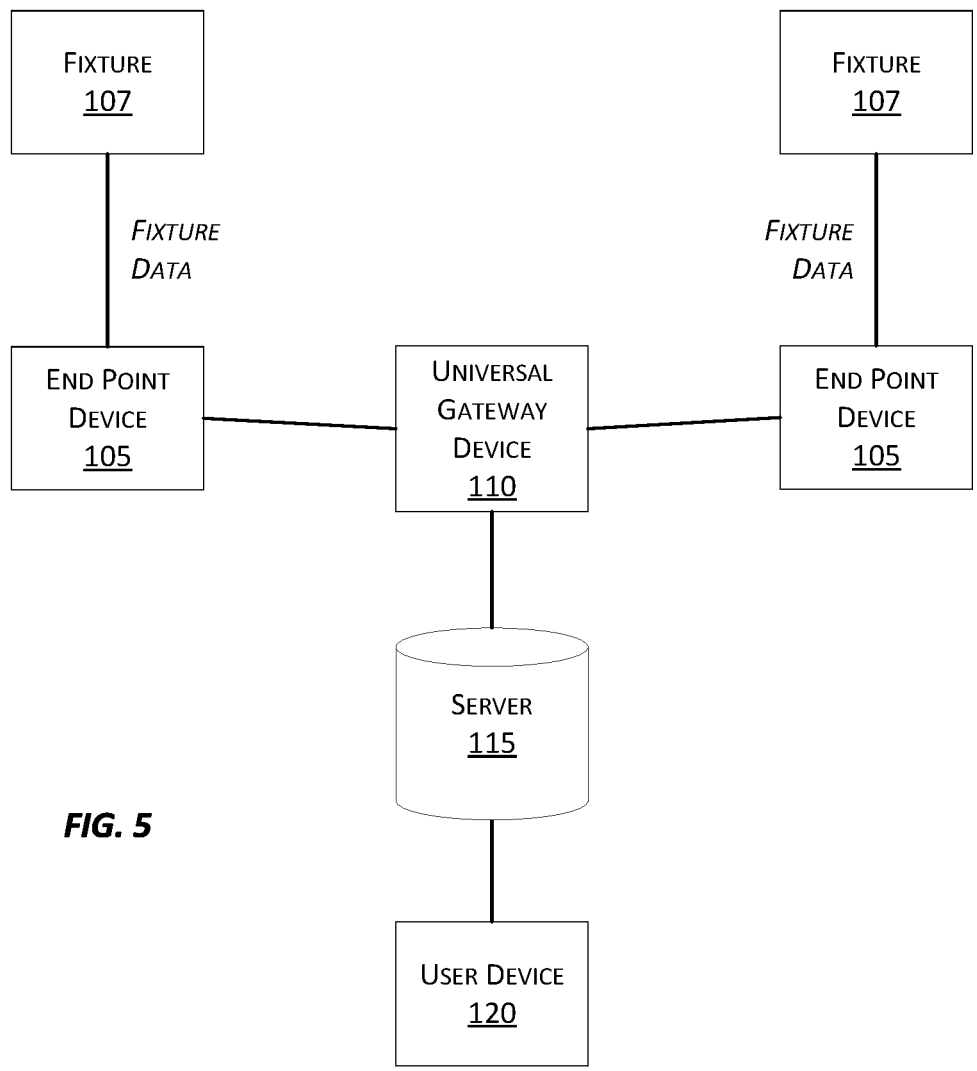
FIG. 5 schematically illustrates communication between components of the system 100 according to some embodiments.

FIG. 4 is a flowchart illustrating a method 400 for monitoring and managing a facility using the universal gateway device 110 according to some embodiments. The method 400 is described as being performed by the universal gateway device 110 and, in particular, the gateway electronic processor 300 executing instructions. However, as noted above, the functionality performed by the universal gateway device 110 (or a portion thereof) may be performed by other devices (via an electronic processor executing instructions). The method 400 is described with reference to FIG. 5. FIG. 5 schematically illustrates communication between components of the system 100 according to some embodiments.

As seen in FIG. 4, the method 400 includes receiving, via a first communication protocol, a first set of data from a first end point device 105 (at block 405). The gateway electronic processor 300 also receives, via a second communication protocol different from the first communication protocol, a second set of data from a second end point device 105 (at block 410). The first set of data relates to an operation of a first fixture 107 associated with the first end point device 105 (for example, fixture data). The second set of data related to an operation of a second fixture 107 associated with the second end point device 105 (for example, fixture data). As seen in FIG. 5, the universal gateway device 110 (i.e., the gateway electronic processor 300) receive data (for example, fixture data) from the end point devices 105. In some embodiments, the universal gateway device 110 (i.e., the gateway electronic processor 300) receives additional or fewer sets of data (for example, a third set of data from a third end point device 105 and the like).

In response to receiving the first set of data and the second set of data (at blocks 405 and 410), the gateway electronic processor 300 processes (or converts) the first set of data and the second set of data pursuant to a third communication protocol (at block 415). In some embodiments, the gateway electronic processor 300 may process (or convert) the first set of data and the second set of data pursuant to specific networking or communication protocol consistent with a network connection between the universal gateway device 110 and a remote device, such as, for example, the server 115, the user device 120, or a combination thereof (for example, for transmitting fixture data). As one example, the gateway electronic processor 300 may convert the data pursuant to LoRa networking protocols for transmission over a LoRa connection between the universal gateway device 110 and the server 115, the user device 120, or a combination thereof.

Alternatively or in addition, the gateway electronic processor 300 may process (or convert) the first set of data and the second set of data pursuant to specific networking or communication protocol consistent with a network connection between the universal gateway device 110 and one or more of the end point devices 105 (for example, for transmitting control data). As one example, the gateway electronic processor 300 may convert the data pursuant to LoRa networking protocols for transmission over a LoRa connection between the universal gateway device 110 and a first end point device 105. As another example, the gateway electronic processor 300 may convert the data pursuant to BLE networking protocols for transmission over a BLE connection between the universal gateway device 110 and a second end point device 105.

After processing the first set of data and the second set of data (at block 415), the gateway electronic processor 300 enables, via the third communication protocol, transmission of the processed first set of data and the processed second set of data to a remote device for virtual processing (at block 420). In some embodiments, the gateway electronic processor 300 transmits the processed data for virtual processing over a network associated with the third communication protocol. As described above, the gateway electronic processor 300 may transmit the processed data to, for example, the server 115, the user device 120, or a combination thereof. As one example, as illustrated in FIG. 5, the universal gateway device 110 transmits the processed data to the server 115. In some embodiments, the third communication protocol is the same as the first communication protocol, the second communication protocol, or a combination thereof. Alternatively, in other embodiments, the third communication protocol is different from the first communication protocol, the second communication protocol, or a combination thereof.

In some embodiments, the end point device 105 (for example, the electronic processor 200) maintains a backlog of data packets (for example, the converted data) until a connection to, for example, the universal gateway device 110 is available (for example, in the event that a connection to the universal gateway device 110 is temporarily unavailable). The universal gateway device 110 may then forward the data to a remote device, server, or database for virtual processing in the cloud, such as, for example, the server 115, the user device 120, or a combination thereof (as seen in FIG. 5). As one example, a user may use the user device 120 (or another remote device) to access and interact with the data. The user may view and interact with usage patterns, which may allow a facility entity or maintainer insights into, for example, how to optimize cleaning and maintenance schedules (for example, for preventative or predicted maintenance), whether there is a need for additional facilities, end point devices, or a combination thereof, and the like. As noted above, in some embodiments, the server 115 is configured to monitoring and managing one or more facilities, including the fixtures 107 therein. In some embodiments, the server 115 (via an electronic processor of the server 115) may receive fixture data from the universal gateway device 110. In response to receiving the fixture data, the server 115 may process the fixture data in order to determine usage information or patterns associated with the one or more facilities, including the fixtures 107 thereof.

As one example, where the fixture 107 is a faucet, the server 115 may analyze the fixture data to monitor the communications between the EM elements 125 of a fixture 107 (for example, a sensor and an actuator) to track, among other things, the number of "ON" and "OFF" signals (or activations). Alternatively or in addition, the server 115 may analyze the fixture data to detect the flow of water by monitoring temperature data from a temperature sensor (as an EM element 125 of the fixture 107) either positioned within the drain or the faucet itself. Alternatively or in addition, the server 115 may analyze the fixture data to determine when a run-on condition has occurred in response to determine that a predetermined period of time set by a user is exceeded and the faucet did not return to an "OFF"

condition or water flow is still detected. Alternatively or in addition, the server 115 may analyze the fixture data to calculate water usage indirectly based at least in part on a duration of time that the valve of the faucet remains open and an estimated water flow rate.

As yet another example, where the fixture 107 is a flush valve, the server 115 may analyze the fixture data to monitor a magnitude of a voltage and/or current supplied to the EM element 125 (for example, an actuator) of the fixture 107 to track when a flushing event has been initiated. Alternatively or in addition, the server 115 may analyze the fixture data to determine when an "ON" signal is provided (for example, a person is detected) but no corresponding movement of the valve occurs. In such instances, the server 115 may generate and provide an error signal such that an alert may be generated via, for example, the universal gateway device 110, the user device 120, another component of the system 100, or a combination thereof. Such faults may be detected by detecting an elevated voltage or current rate (for example, motor is bound). Alternatively or in addition, the server 115 may analyze the fixture data to determine a length of time a person is detected using the fixture 107 on any given instance.

As yet another example, where the fixture 107 is a resource dispenser, the server 115 may analyze the fixture data to monitor a magnitude of a voltage and/or current supplied to an EM element 125 (for example, an actuator) of a fixture 107 to track when a resource dispensing event has occurred. Alternatively or in addition, the server 115 may analyze the fixture data to monitor a level or amount of resource remaining in a reservoir of the fixture 107. The server 115 may calculate an amount of resource remaining in a reservoir of the fixture 107 by subtracting a predetermined volume or amount of resource discharged during a resource dispensing event for each detected activation. In some embodiments, when the server 115 determines that a level or amount of resource remaining in a reservoir of the fixture 107 has fallen below a predetermined amount or level, the server 115 may generate and provide an error signal such that an alert may be generated via, for example, the universal gateway device 110, the user device 120, another component of the system 100, or a combination thereof.

Additionally, in some embodiments, the battery life (for example, an energy level or energy usage) may be monitored using various indicators, such as a graphical representation of a fuel gauge. Alternatively or in addition, in some embodiments, the server 115 (an electronic processor thereof) may generate alerts and warnings in response to detecting a predetermined energy level, where the predetermined energy level indicates an end of battery life scenario, an energy source replacement scenario, and the like. As one example, when the electronic processor of the server 115 detects a predetermined energy level indicating a low energy level, the electronic processor of the server 115 may generate and transmit a low energy level alert to a user of the user device 120 (via, for example, a display device of the user device 120).

As noted above, in some embodiments, the universal gateway device 110 receives and transmits data bi-directionally. Accordingly, in some embodiments, the universal gateway device 110 transmits data, such as control data) to one or more of the end point devices 105 in addition to or alternatively to receiving data from one or more of the end point devices 105. As one example, the universal gateway device 110 may receive an operation command for operating a fixture 107 (as control data) from the user device 115 and forward or transmit the operation command to the fixture 107 (via a corresponding end point device 105). In response to receiving the operation command, the fixture 107 may operate in accordance with the operation command.

Accordingly, in some embodiments, the gateway electronic processor 300 receives, via a communication protocol (for example, a third communication protocol), control data for controlling a fixture 107 associated with an end point device 105 (for example, a first fixture 107 associated with a first end point device 105). The gateway electronic processor 300 may receive the control data (such as an operation command or control parameter) from the server 115, the user device 120, another component of the system 100, or a combination thereof. In response to receiving the control data, the gateway electronic processor 300 may process the control data for transmission via another communication protocol (for example, a first communication protocol or a second communication protocol). After processing (or converting) the control data, the gateway electronic processor 300 may then transmit, via the other communication protocol, the processed control data to the end point device 105 corresponding to the fixture 107.

In some embodiments, the communication protocol in which the control data is received is different from the communication protocol in which the control data is transmitted. As one example, the gateway electronic processor 300 may receive, via a LoRa communication protocol, control data for a fixture 107 associated with an end point device 105. After processing the control data, the gateway electronic processor 300 may transmit, via a BLE communication protocol, the processed control data to the fixture 107 associated with the end point device 105. Alternatively or in addition, in some embodiments, the communication protocol in which the control data is received is the same as the communication protocol in which the control data is transmitted.

Thus, the embodiments provide, among other things, to methods and systems for monitoring and managing a facility using a universal gateway device. Various features and advantages of certain embodiments are set forth in the following claims.

What is claimed is:

1. A universal gateway device associated with a facility, the universal gateway device comprising:
an electronic processor configured to:
receive, via a first communication protocol, a first set of data from a first end point device, the first set of data related to an operation of a first fixture associated with the first end point device, wherein the first end point device maintains a backlog of data packets comprising the first set of data until the universal gateway device is available to receive the data packets;
process the first set of data for transmission via a second communication protocol,
provide, via the second communication protocol, the first set of data to a remote device for virtual processing;
receive, from the remote device via the second communication protocol, a first control command for controlling the operation of the first fixture, wherein the first control command is determined based on usage data or pattern data determined from the first set of data;
process the first control command for transmission via the first communication protocol; and provide, via the first communication protocol, the first control command to the first end point device.

2. The universal gateway device of claim 1, wherein the second communication protocol is a long range (LoRa) communication protocol.

3. The universal gateway device of claim 1, wherein the second communication protocol is different from the first communication protocol.

4. The universal gateway device of claim 1, wherein the first fixture is a water management solution.

5. The universal gateway device of claim 1, wherein the electronic processor is further configured to
receive, via a third communication protocol different from the first communication protocol, a second set of data from a second end point device, the second set of data related to an operation of a second fixture associated with the second end point device;
process the second set of data for transmission via the second communication protocol,
provide, via the second communication protocol, the second set of data to the remote device for virtual processing;
receive, from the remote device via the second communication protocol, a second control command for controlling the operation of the second fixture, wherein the second control command is determined based on usage data or pattern data determined from the second set of data;
process the second control command for transmission via the third communication protocol; and
provide, via the third communication protocol, the second control command to the second end point device.

6. The universal gateway device of claim 5, wherein the third communication protocol is different from the first communication protocol.

7. The universal gateway device of claim 5, wherein the second end point device maintains a backlog of data packets comprising the second set of data until the universal gateway device is available to receive the data packets.

8. The universal gateway device of claim 1, wherein the first fixture comprises a faucet, a flushometer, a flush valve, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air or room quality sensor, a leak detection sensor, an occupancy detection sensor, or a resource dispenser.

9. A system for monitoring and managing a facility, the system comprising:
a first end point device associated with a first fixture;
a second end point device associated with a second fixture;
a remote device including a first electronic processor;
a universal gateway device including a second electronic processor configured to:
receive, via a first communication protocol, a first set of data from the first end point device, the first set of data related to an operation of the first fixture, wherein the first end point device maintains a backlog of data packets comprising the first set of data until the universal gateway device is available to receive the data packets;
receive, via a second communication protocol different from the first communication protocol, a second set of data from the second end point device, the second set of data related to an operation of the second fixture;
process the first set of data for transmission via a third communication protocol;
process the second set of data for transmission via the third communication protocol;
provide, via the third communication protocol, the first set of data to the remote device for virtual processing;
provide, via the third communication protocol, the second set of data to the remote device for virtual processing;
receive, from the remote device via the third communication protocol, a first control command for controlling the operation of the first fixture;
receive, from the remote device via the third communication protocol, a second control command for controlling the operation of the second fixture;
process the first control command for transmission via the first communication protocol;
process the second control command for transmission via the second communication protocol;
provide, via the first communication protocol, the first control command to the first end point device; and
provide, via the second communication protocol, the second control command to the second end point device;
wherein the first electronic processor is configured to:
receive, via the third communication protocol, the first set of data or the second set of data from the universal gateway device;
determine the first control command or the second control command based on the first set of data or the second set of data respectively;
provide, via the third communication protocol, the first control command or the second control command to the universal gateway device.

10. The system of claim 9, wherein the second communication protocol is a long range (LoRa) communication protocol.

11. The system of claim 9, wherein the second communication protocol is the same as the third communication protocol.

12. The system of claim 9, wherein the third communication protocol is different from the first communication protocol.

13. The system of claim 9, wherein the first fixture is a water management solution.

14. The system of claim 9,
wherein the second end point device maintains a backlog of data packets comprising the second set of data until the universal gateway device is available to receive the data packets.

15. The system of claim 14, wherein the third communication protocol is different from the first communication protocol.

16. The system of claim 14, wherein the third communication protocol is the same as the second communication protocol.

17. A method for monitoring and managing a facility, the method comprising:
receiving, via a first communication protocol, a first set of data from a first end point device, the first set of data related to an operation of a first fixture associated with the first end point device;

processing the first set of data for transmission via a second communication protocol, providing, via the second communication protocol, the first set of data to a remote device for virtual processing;

receiving, from the remote device via the second communication protocol, a first control command for controlling the operation of the first fixture, wherein the first control command is determined based on usage data or pattern data determined from the first set of data;

processing the first control command for transmission via the first communication protocol; and providing, via the first communication protocol, the first control command to the first end point device.

18. The method of claim 17, further comprising:

receiving, via a third communication protocol different from the first communication protocol, a second set of data from a second end point device, the second set of data related to an operation of a second fixture associated with the second end point device;

processing the second set of data for transmission via the second communication protocol;

providing, via the second communication protocol, the second set of data to the remote device for virtual processing;

receiving, from the remote device via the second communication protocol, a second control command for controlling the operation of the second fixture, wherein the second control command is determined based on usage data or pattern data determined from the second set of data;

processing the second control command for transmission via the third communication protocol; and providing, via the third communication protocol, the second control command to the second end point device, wherein the third communication protocol is different from the first communication protocol.

19. The method of claim 18, wherein the second end point device maintains a backlog of data packets comprising the second set of data until the universal gateway device is available to receive the data packets.

20. The method of claim 17, wherein the first fixture comprises a faucet, a flushometer, a flush valve, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air or room quality sensor, a leak detection sensor, an occupancy detection sensor, or a resource dispenser.

* * * * *